US010813502B2

(12) United States Patent
 Koeng

(10) Patent No.: US 10,813,502 B2
(45) Date of Patent: Oct. 27, 2020

(54) MULTI-FUNCTIONAL CHEESE STORAGE CONTAINERS

(71) Applicant: Tate Koeng, Aurora, OR (US)

(72) Inventor: Tate Koeng, Aurora, OR (US)

(*) Notice: Subject to any disclaimer, the term of this patent is extended or adjusted under 35 U.S.C. 154(b) by 250 days.

(21) Appl. No.: 16/153,426

(22) Filed: Oct. 5, 2018

(65) Prior Publication Data
 US 2020/0107678 A1 Apr. 9, 2020

(51) Int. Cl.
| | |
|---|---|
| *A47J 43/25* | (2006.01) |
| *B65D 85/76* | (2006.01) |
| *B65D 43/16* | (2006.01) |
| *B26D 1/547* | (2006.01) |
| *B65D 1/04* | (2006.01) |

(Continued)

(52) U.S. Cl.
 CPC .............. *A47J 43/25* (2013.01); *B02C 23/02* (2013.01); *B26D 1/04* (2013.01); *B26D 1/547* (2013.01); *B65D 43/165* (2013.01); *B65D 85/76* (2013.01); *B26D 2210/02* (2013.01)

(58) Field of Classification Search
 CPC .. A47J 43/25; A47J 47/08; A47J 47/10; A47J 47/12; B65D 85/76; B65D 43/165; B26D 1/547; B26D 1/04; B26D 2210/02; B26D 5/10; B26D 5/08; B26D 5/06; B26D 5/22; B26D 2210/06; B02C 23/02; A47G 19/30
 USPC ........................................ 198/812, 594, 588
 See application file for complete search history.

(56) References Cited

U.S. PATENT DOCUMENTS

| | | | | |
|---|---|---|---|---|
| 2,087,101 A | * | 7/1937 | Cerracchio | ............. A47J 43/25 241/95 |
| 4,266,668 A | * | 5/1981 | Paek | ....................... A47J 47/12 206/557 |

(Continued)

FOREIGN PATENT DOCUMENTS

| | | | |
|---|---|---|---|
| CN | 108634819 A | * 10/2018 | |
| CN | 108858316 A | * 11/2018 | |
| DE | 102016005370 A1 | * 11/2017 | ............... B26D 7/01 |

OTHER PUBLICATIONS

English translate (CN108858316A), retrieved date Jul. 9, 2020.*
English translate (DE102016005370A1).*
English translate (CN108634819A), retrieved date Jul. 9, 2020.*

*Primary Examiner* — Adam J Eiseman
*Assistant Examiner* — Mohammed S. Alawadi
(74) *Attorney, Agent, or Firm* — Mark S Hubert

(57) ABSTRACT

A method, system, apparatus, and/or device for cutting, slicing, or grating cheese. The method, system, apparatus, and/or device may include a receptacle that include a cavity to store a piece of cheese, wherein the receptacle includes an open end. The method, system, apparatus, and/or device may include a platform located within the cavity, the platform comprising a floor for the piece of cheese to sit on, where the floor includes a set of grooves. The method, system, apparatus, and/or device may include a drive system connected to the platform, the drive system being configured to extend the platform out of the open end and retract the platform within the cavity, where the drive system comprises a gear comprising a set of teeth configured to engage one or more grooves of the set of grooves of the floor. The method, system, apparatus, and/or device may include a handle configured to attach to the open end of the receptacle, the handle comprising a first accessory to engage the piece of cheese.

17 Claims, 7 Drawing Sheets

(51) Int. Cl.
*B02C 23/02* (2006.01)
*B26D 1/04* (2006.01)

(56) References Cited

U.S. PATENT DOCUMENTS

| | | | | |
|---|---|---|---|---|
| 2009/0211463 A1* | 8/2009 | Marrone | .................. | A47J 47/12 |
| | | | | 99/646 C |
| 2011/0283548 A1* | 11/2011 | White | .................. | A21C 11/106 |
| | | | | 30/301 |
| 2012/0085850 A1* | 4/2012 | Tetreault | .................. | A47J 43/25 |
| | | | | 241/101.2 |

* cited by examiner

MULTI-FUNCTIONAL CHEESE STORAGE CONTAINERS

BACKGROUND

When storing perishable food products at home, a food storage container should keep the food products fresh until they are consumed. To keep the food products fresh, the food storage container forms a seal around the perishable food to keep the food away from air until the perishable food is consumed. The conventional food storage containers that to preserve perishable food include refrigerator, sealed containers, plastic or foil wrapping, and so forth. However, the conventional food storage containers are difficult to use, fail to maintain the seal around the food, and only have a single function.

BRIEF DESCRIPTION OF THE DRAWINGS

The present description will be understood more fully from the detailed description given below and from the accompanying drawings of various embodiments of the present embodiment, which is not to be taken to limit the present embodiment to the specific embodiments but are for explanation and understanding.

DETAILED DESCRIPTION

Figure 1:
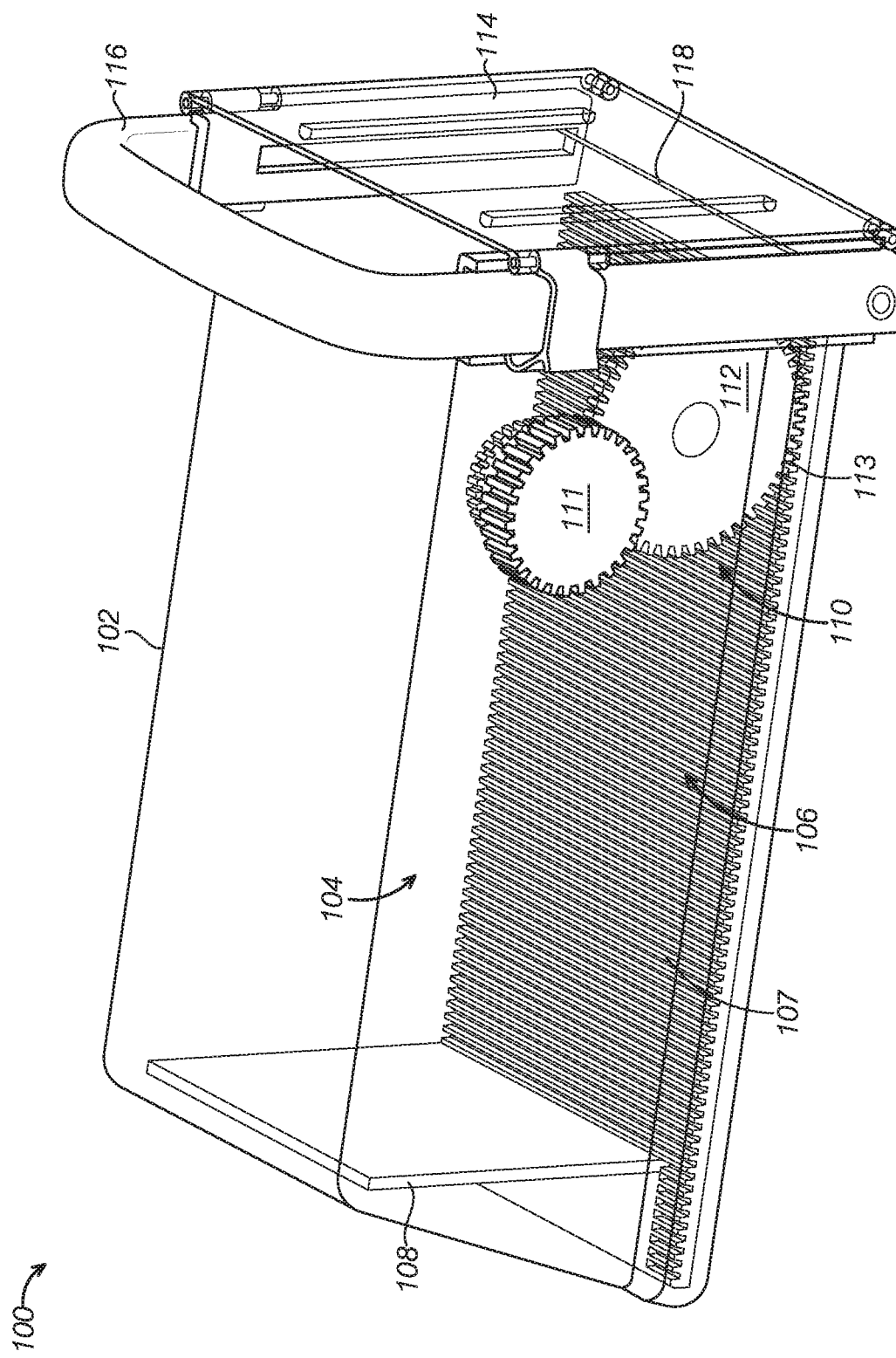
FIG. 1 illustrates a side perspective view of a multi-functional cheese storage container, according to an embodiment.

The disclosed multi-functional cheese storage containers will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of multi-functional cheese storage container examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

A typical individual purchasing cheese at a grocery store has two options, purchase a large brick of cheese or purchase pre-sliced or grated cheese that can be two or more times the cost of the large brick of cheese. An individual that opts for purchasing the large brick of cheese must then determine how to store the cheese to avoid or minimize wasting the cheese due to the cheese drying out, getting crusty, becoming moldy, or otherwise going bad. Conventionally, after the individual opens the packaging for the cheese and consume a portion of the cheese, the individual will store the cheese in a sealable plastic bag or a rubber container. The sealable plastic bag or a rubber container has a single function, to preserve the cheese, and when the individual desires to consume more of the cheese, the consumer must remove the cheese from the sealable plastic bag or a rubber container, find a knife to cut the cheese, and return the remaining portion of the cheese to the sealable plastic bag or a rubber container for future use.

The conventional sealable container may be difficult to use, as the sealable container is not configured or shaped to form around the cheese, which leaves a substantial amount of air within the sealable container that causes the cheese to go bad. Additionally, the conventional sealable container may be difficult to wash, and in the case of a plastic bag, is often discarded after the brick of cheese is consumed.

Furthermore, the conventional method of cutting or grating the cheese by hand with a knife or hand grater may provide an inferior cheese product. For example, when an individual cuts the cheese into slices using a knife, the individual must first find a knife that is long enough to slice the cheese. Once the individual finds such a knife, as the individual slices the cheese, they typically slice the cheese unevenly, causing the slices of cheese to be deformed or not uniform as well as disfiguring the remaining brick of cheese. In another example, when an individual grates the cheese using a hand grater, the individual must first find the hand grater and grate the cheese. As the individual grates the cheese using the hand grater, the individual must be careful avoid cutting themselves on the sharp edges of the grater. The individual must also apply even pressure across the brick of cheese as they grate the cheese to avoid disfiguring the remaining brick of cheese, as the disfigured cheese is more difficult to store properly.

Implementations of the disclosure address the above-mentioned deficiencies and other deficiencies by providing a method, system, device, and/or apparatus to store and slice or grate a brick of cheese. The method, system, device, or apparatus may utilize a sealable storage container shaped for the cheese. The cheese storage container may also include an adjustable platform that may be extended toward an end of the storage container that includes an integrate slicer or grater. One advantage of the cheese storage container may be to provide a cheese block sized airtight storage device that reduces or eliminates air within the cheese storage container to increase the shelf life of the cheese. Another advantage of the cheese storage container may be to provide a user with an integrated slicer to quickly, cleanly, and consistently cut slices of cheese. Another advantage of the adjustable platform of the cheese storage container may be to allow the user to adjust the thickness of the cheese slices while maintaining the consistency of the thickness of the slices. Another advantage of the cheese storage container may be to provide a user with an integrated grater to safely and easily grate the brick of cheese. Another advantage of the cheese storage container may be to provide interchangeable handles or heads to allow the user to perform multiple functions using a single device.

FIG. 1 illustrates a side perspective view of a multi-functional cheese storage container 100, according to an embodiment. The multi-functional cheese storage container 100 may include a receptacle 102, a platform 106, a drive system 110, a cover 114, and/or an accessory 118. In one embodiment, the receptacle 102 may be a box or carton for holding a brick of cheese, a block of cheese, or a piece of cheese. For example, the receptacle 102 may be a fully sealed container or a partially sealed container. In one example, the receptacle 102 may include a rectangular container with a cavity 104 and an open end to insert and/or extract a brick of cheese. In one embodiment, the receptacle 102 may enclose around the tray or the platform 106, where the platform 106 rests inside the cavity 104 of the receptacle 102. To form an air-tight seal, the cover 114 may be fastened to the open end of the receptacle 102 to form the air-tight seal around the brick of cheese and reduce or eliminate the brick of cheese from spoiling or going bad. In one example, the brick of cheese may be approximately 3.25 inches wide, 3.25 inches tall, and 7 inches long and the receptacle 102 may be shaped to form an air-tight box around the brick of cheese, in one example, the brick of cheese may be approximately 2 inches wide, 2 inches tall, and 5 inches long and the receptacle 102 may be shaped to form an air-tight box around the brick of cheese. The approximate dimensions of the brick of cheese may vary +/−0.25 inches. The dimensions of the brick of cheese and the receptacle 102 may vary and is not intended to be limiting.

In another embodiment, the platform 106 may be connected to an open bottom of the receptacle 102. In one example, when the platform 106 is connected to the bottom of the receptacle 102, the receptacle 102 and the platform 106 may connect together to form the open-ended receptacle with the cavity 104. In this example, to form the air-tight container, the cover 114 may form a seal around the open end of the receptacle 102 and the platform 106 so that when the cover 114 is attached, the brick of cheese is sealed within the air-tight container and when the cover 114 is detached or disconnected the brick of cheese may be accessed or removed.

In one embodiment, the receptacle 102, the platform 106, and/or the cover 114 may include transparent or translucent materials, such as glass, plastic, acrylic, plexiglass, and so forth. The transparent or translucent materials may allow an individual to see the brick of cheese in the cavity 104 and/or other part or components located within the multi-functional cheese storage container 100. In another embodiment, the receptacle 102, the platform 106, and/or the cover 114 may include light reflective or light absorbing materials that are non-transparent or non-translucent, such as colored plastic, colored acrylic, rubber, and so forth. The non-transparent or non-translucent materials may shield the contents stored within the multi-functional cheese storage container 100 from the light. For example, when the contents are cheese, light may increase the temperature of the cheese to cause it to melt or spoil or the light may change one or more properties of the cheese if the light were to enter the multi-functional cheese storage container 100.

The platform 106 may provide a podium for the brick of cheese to rest on as the cheese is stored in the multi-functional cheese storage container 100. In one embodiment, the platform 106 may include a floor 107 and a back wall 108. In one example, the back wall 108 may connect to the floor 107 at a 90-degree angle. In another example, the back wall 108 may connect to the floor 107 at an angle between 30 degrees and 150 degree. The back wall 108 may act as a stopper approximate a back end or closed end of the multi-functional cheese storage container 100. In one example, the back wall 108 may provide a wall for the brick of cheese to be pressed against to reduce or eliminate the movement of the brick of cheese as the brick of cheese is sliced or grated. In another example, the back wall 108 may provide a wall for the brick of cheese to be pressed against to move the brick of cheese forward as the drive system 110 extends the platform 106 to reach outside the cavity 104 or retracts the platform 106 to be within the cavity 104.

The drive system 110 may be connected to the platform 106 such that when the drive system 110 is engaged, the drive system 110 may move the platform 106 along a plane to extend and retract the platform 106 relative to the cavity 104. In one example, the drive system 110 may be a hand crank system. The hand crank system may include a handle or knob 111 that is connected to second gear 112 by a pinion gear 199 that is concentrically affixed to the inner face 192 of the knob 111. In one example, the handle or knob 111 may be a crank that is a knob or an arm with a handle. The knob or the handle 111 may be a first revolving gear that rotationally engages the first set of teeth 198 of its connected pinion gear 199 to the second set of teeth 197 of a second gear 112. The second gear 112 may be connected to the platform 106. As an individual turns the knob 111, the knob 111 may rotate the pinion gear 199 and the second gear 112, and the second gear 112 may, in turn, extend or retract the platform 106 along a horizontal plane relative to the multi-functional cheese storage container 100. In one example, the second gear 112 may be connected to a conveyor belt that moves the platform 106 forward and backward.

In another example, the platform 106 may include a set of grooves or teeth 113 that may correspond to one of the gears 112. In one embodiment, the set of grooves or teeth 113 running laterally from a first side of the floor to a second side of the floor. In another embodiment, the set of grooves or teeth 113 running laterally across a portion of the floor, such as partially from the first side to the second side of the floor. As the gears 112 rotate, the gears 112 may engage the grooves or teeth 113 of the platform 106. For example, to extend or move the platform forward, the gears 112 may rotate clockwise. As the gears 112 rotate clockwise, the gears 112 may grab one or more of the grooves or teeth 113 to propel the platform 106 forward as the gears 112 rotate. In another example, as the gears 112 rotate counter-clockwise, the gears may grab one or more of the grooves or teeth 113 to propel the platform 106 backward as the gears 112 rotate. The direction of rotation of the gears 112 and the direction the platform 106 is propelled is not intended to be limiting and may be the opposite of what is described above. The number of gears 112 is also not intended to be limiting. For example, the number of gears 112 may be adjusted based on how many turns of the gears 112 are desired to move the platform 106 a desired distance relative to the open end of the multi-functional cheese storage container 100.

In another embodiment, the drive system 110 may be electrically driven. For example, a servo or an electric motor may be connected to a power source, such as a battery. When power is applied to the servo or electric motor, the servo or electric motor may drive the platform 106 forward and/or backward.

As discussed above, the cover 114 may be attached to an open end of the receptacle 102. The cover 114 may be configured to switch between an open position and a closed position. When the cover 114 is in the closed position, the multi-functional cheese storage container 100 may form an air-tight seal around the brick of cheese. The air-tight seal between the receptacle and the cover 114 may extend the shelf life of the cheese stored in the cavity 104 by eliminating outside air from entering the cavity 104 when the cover 114 is in the closed position. When the cover 114 is in the open position, the drive system 110 may extend the platform 106 through the open end of the receptacle 102.

The handle 116 may also be attached to the open end of the receptacle 102. The handle 116 may include an accessory 118 attached to at least a portion of the handle 116. For example, the accessory 118 may be a blade, a slicing wire, or a grater that is attached to a bottom of the handle 116. In one embodiment, when the handle 116 includes the slicing wire or the blade, the handle 116 may be raised prior to or as the platform 106 is propelled forward. The platform 106 may be propelled forward by a defined amount and then the handle 116 may be pressed downward to slice a portion of cheese with a defined thickness from the brick of cheese. The thickness of the slice of cheese may be based on how far the platform 106 is propelled forward.

In another embodiment, when the handle 116 includes the grater, the handle 116 may be raised prior to or as the platform 106 is propelled forward. As the platform 106 is propelled forward, the handle 116 may be raised and lowered to grate the cheese with the grater. The amount of cheese that is grated may be based on how far the brick of cheese is propelled forward as the cheese is grated. The handle 116 may include one or more springs or elevating devices located on either or both sides of the handle 116 which push the handle 116 back to the raised position after each chop or grating motion.

In one embodiment, the handle or knob 111 may be located along an exterior surface of the multi-functional cheese storage container 100. In another embodiment, the gears 112 may be integrated into a wall of the receptacle 102. In another embodiment, the gears 112 may be located within the cavity 104. As discussed above, the gears 112 may be used to move the platform 106 in and out to adjust a distance the platform 106 extends from the open end of the receptacle 102, which determines a thickness of the cheese slices cut using the accessory 118 of the handle. For example, the knob 111 may protrude through the exterior of the receptacle 102 and may be connected to one of the gears 112. A user able to move the knob 111 with their thumb or index finger, the turning which drives the gears(s) 112 and moves the platform 106 in or out of the cavity 104. The number of turns of the knob 111 defines the distance the platform 106 moves so that the thickness of the slices of cheese or the amount of cheese grated may be uniform.

Figure 2A:
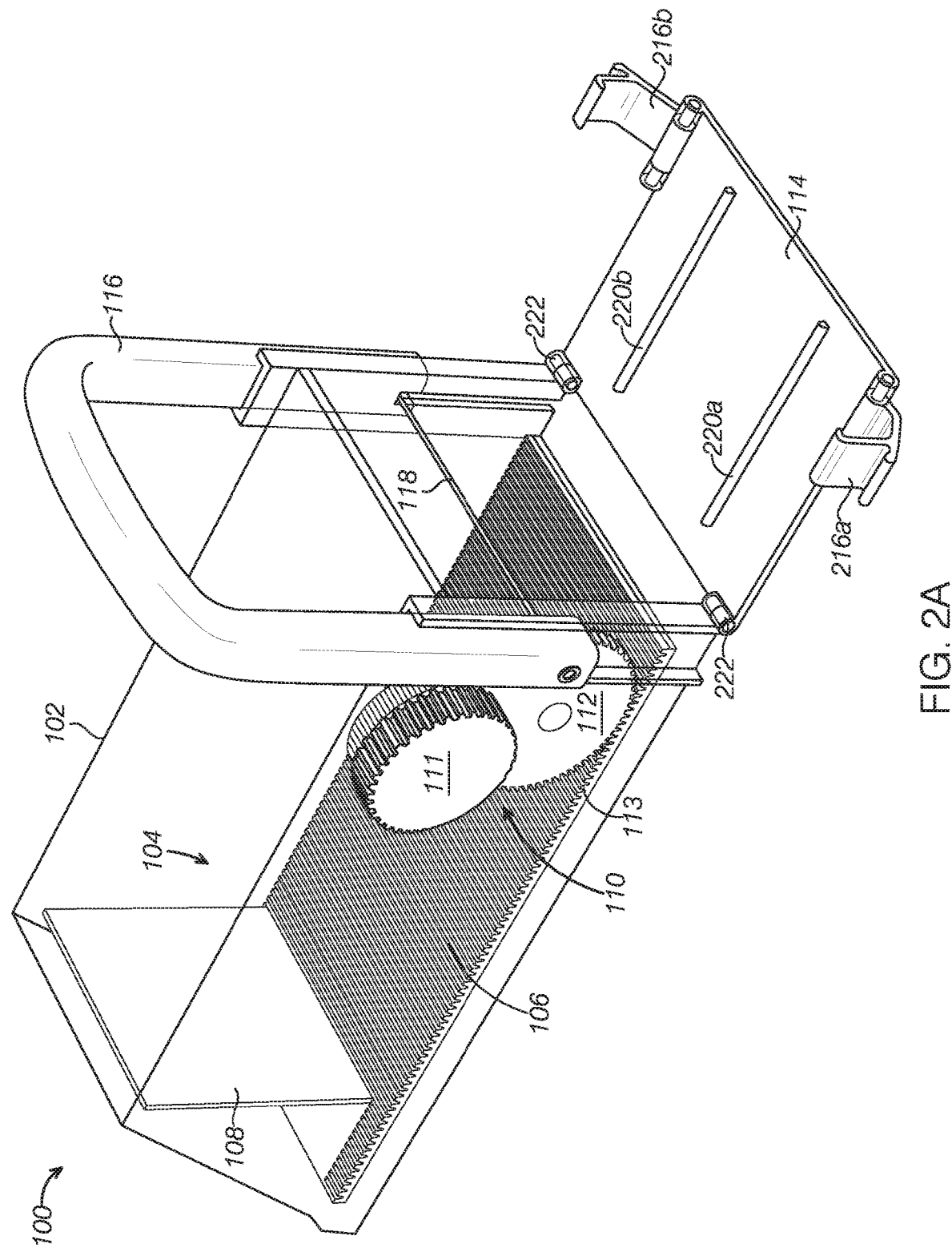
FIG. 2A illustrates a side perspective view of the multi-functional cheese storage container with the cover in an open position, according to an embodiment.

FIG. 2A illustrates a side perspective view of the multi-functional cheese storage container 100 with the cover 114 in an open position, according to an embodiment. Some of the features in FIG. 2A are the same or similar to some of the features in FIG. 1 as noted by same reference numbers, unless expressly described otherwise.

As discussed above, the cover 114 may be configured to be in an open position or a closed position. In one embodiment, the cover 114 may be attached to the receptacle 102 by one or more hinges 222 and fasteners 216a and/or 216b. When the cover 114 is in the closed position, the cover may rotate about the hinges 222 so that the cover 114 presses against the open end of the receptacle 102 and is perpendicular to the platform 106. When the cover 114 is in the closed position, the fasteners 216a and/or 216b may be fastened to the front or sides of the receptacle 102 so that the cover 114 is pressed against the open end of the receptacle 102 and forms an air-tight seal with the receptacle 102. In one embodiment, the fasteners 216a and/or 216b may be clasps, clips, hooks, and so forth.

In another embodiment, the cover 114 may include guides 220a and/or 220b that may extend at least partially or fully from a first end of the cover 114 to a second end of the cover 114. In one example, the platform 106 may slide along guides at a bottom of the receptacle 102. The cover may include guides 220a and/or 220b that the platform 106 continues to slide along when the cover 114 is in the open position. In one example, the guides in the receptacle 102 and/or the guides 220a and 220b of the cover 114 may be protrusions that extend upward from the receptacle 102 and/or the cover 114 that act as rails for the platform 106 to slide along. In another example, the guides in the receptacle 102 and/or the guides 220a and 220b of the cover 114 may be channels or grooves that extend downward into the receptacle 102 and/or the cover 114 that act as ruts for the platform 106 to slide in.

Figure 2B:
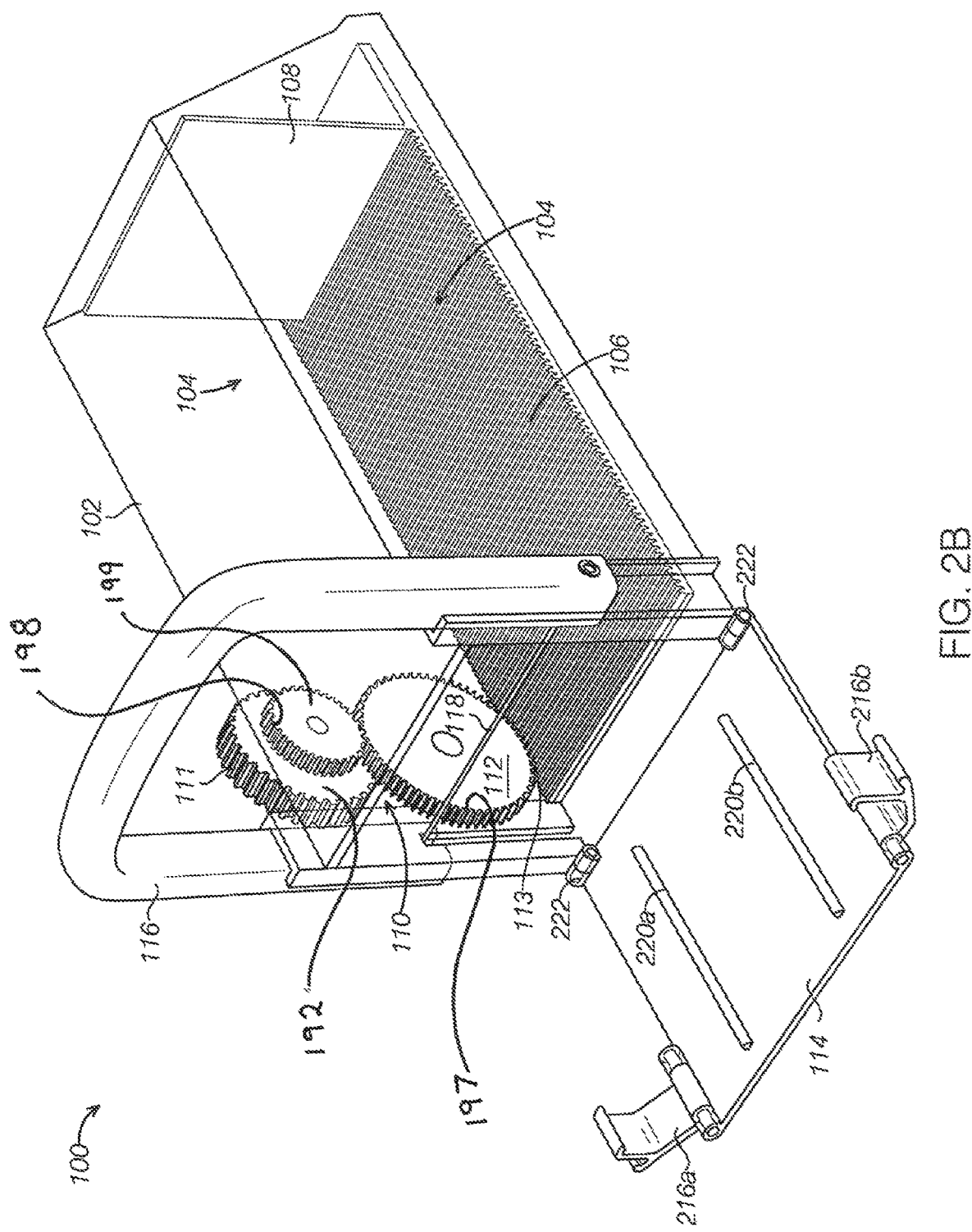
FIG. 2B illustrates another side perspective view of the multi-functional cheese storage container, according to an embodiment.

FIG. 2B illustrates another side perspective view of the multi-functional cheese storage container 100, according to an embodiment. Some of the features in FIG. 2B are the same or similar to some of the features in FIGS. 1 and 2A as noted by same reference numbers, unless expressly described otherwise. As discussed above, the knob 111 may be connected to an outside surface of the receptacle 102. A portion of the knob 111 may extend into the wall or the receptacle 102 or inside the cavity 104 of the receptacle so that the first set of teeth 198 of the pinion gear 199 connected to the inner face 192 of the knob 111 meshing engage with the second set of teeth 197 teeth of the second gear 112 such that the second gear 112 turns as the knob 111 turns. Further as discussed above, the second set of teeth on the second gear 112 may also meshingly engage with the teeth of the platform 106 so that as the knob 111 turns the second gear 112, the second gear 112 moves the platform 106 forward or backward, depending on whether the knob 111 is turned clockwise or counterclockwise.

Figure 2C:
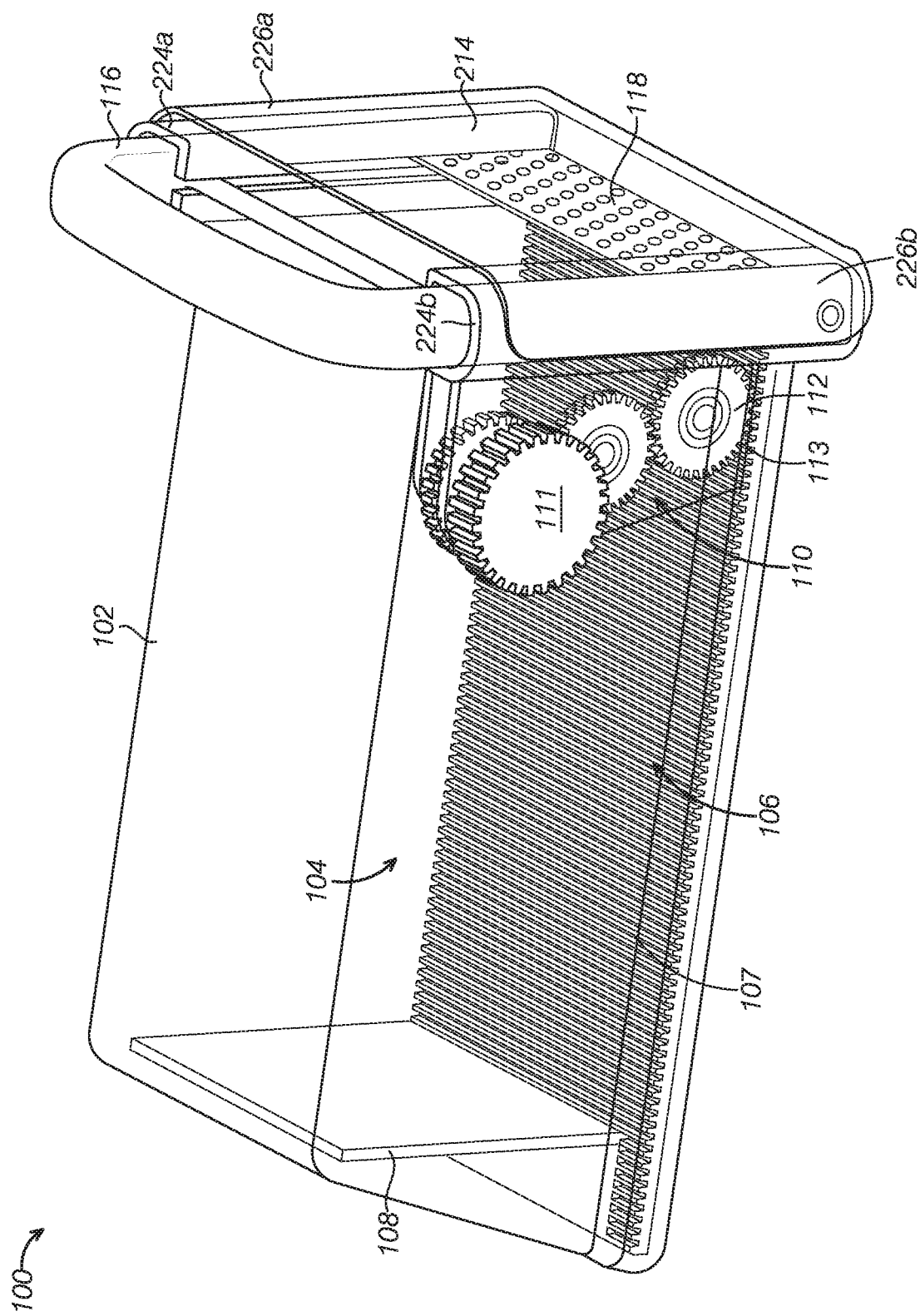
FIG. 2C illustrates a side perspective view of the multi-functional cheese storage container with a cover, according to an embodiment.

FIG. 2C illustrates a side perspective view of the multi-functional cheese storage container 100 with a cover 214, according to an embodiment. Some of the features in FIG. 2C are the same or similar to some of the features in FIGS. 1-2B as noted by same reference numbers, unless expressly described otherwise. As discussed above, the cover 114 in FIGS. 2A and 2B may be hingedly connected to the receptacle 101 in another embodiment, the cover 214 may slide over or snap onto a front portion of the receptacle 102. For example, the front of the receptacle 102 may include tracks or cavities 224a and 224b at each side of the receptacle 102 to receive each side of the handle 116. The tracks or cavities 224a and 224b allow the handle 116 to slide up and down relative to the platform 106 to allow the slicing and/or grating of the brick of cheese, as discussed above. In one embodiment, the tracks or cavities 224a and 224b may extend from the top of the receptacle 102 to the bottom of the receptacle 102 at the open end of the receptacle 102.

In another embodiment, the cover 214 may include channels or guides 226a and 226b at each side of the cover 214 that may slide over the corresponding tracks or cavities 224a and 224b. The channels or guides 226a and 226b may be curved or square tubes that include a partial opening that extends from the top to the bottom of the channels or guides 226a and 226b. When the channels or guides 226a and 226b slide over the tracks or cavities 224a and 224b, the cover 214 may extend from the bottom of the receptacle 102 to the top of the receptacle 102 to form an air-tight seal with the receptacle 102, To remove the cover 214 and open the front end of the receptacle 102, the cover 214 may slide upwardly to pull the cover off of the multi-functional cheese storage container 100.

In another embodiment, the channels or guides 226a and 226b of the cover 214 may snap around the corresponding tracks or cavities 224a and 224b. The channels or guides 226a and 226b may be curved or square tubes that include a partial opening that may expand and then contract to snap around the corresponding tracks or cavities 224a and 224b when the cover 214 is attached to the receptacle 102 from the top to the bottom of the channels or guides 226a and 226b. When the channels or guides 226a and 226b snap to the tracks or cavities 224a and 224b, the cover 214 may be held against the open end of the receptacle 102 to form an air-tight seal with the receptacle 102. To remove the cover 214 from the receptacle 102, the cover 214 may be pulled away from the open end of the receptacle 102 to unsnap the cover 214.

Figure 3A:
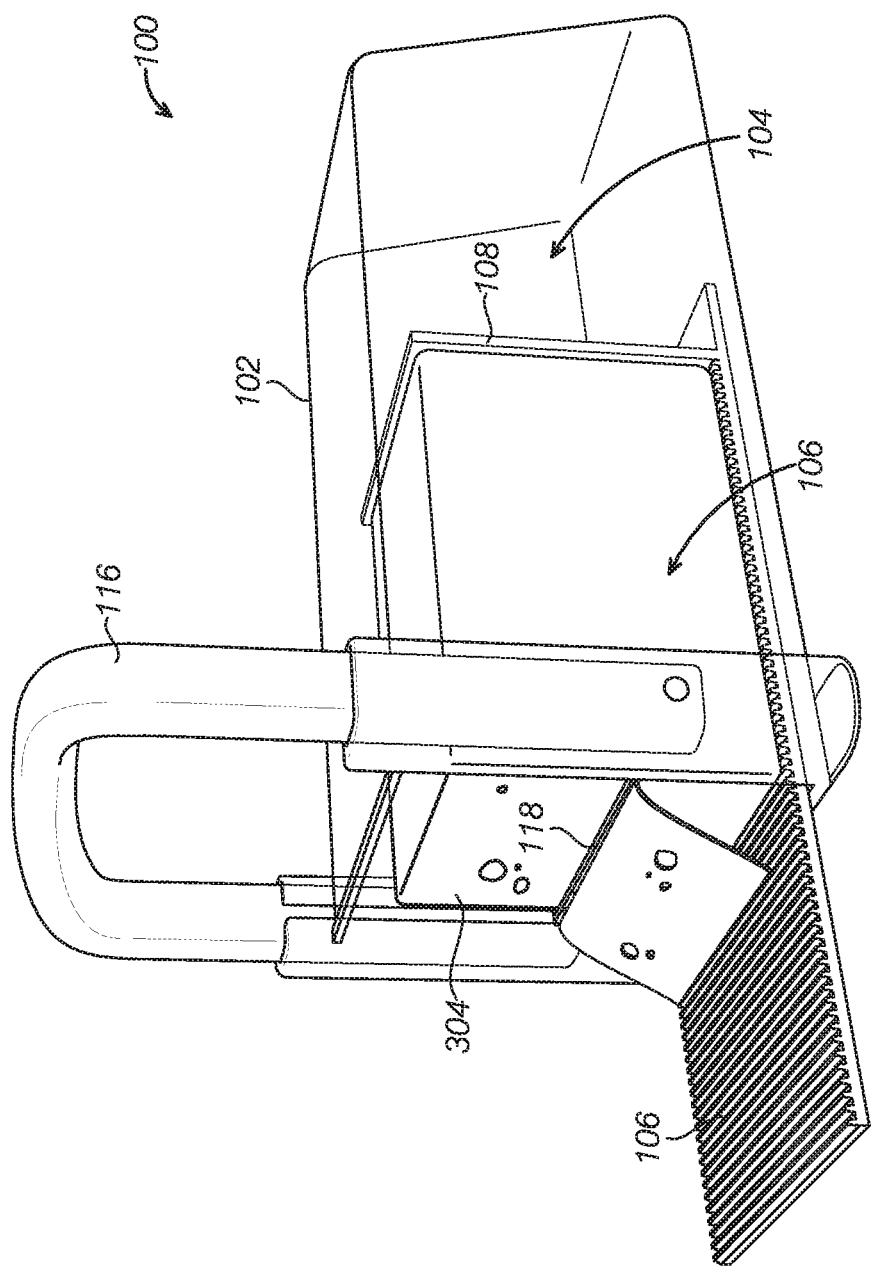
FIG. 3A illustrates the multi-functional cheese storage container with the platform partially extending out of the front open end of the receptacle, according to an embodiment.

FIG. 3A illustrates the multi-functional cheese storage container 100 with the platform 106 partially extending out of the front open end of the receptacle 102, according to an embodiment. Some of the features in FIG. 3A are the same or similar to some of the features in FIGS. 1-2C as noted by same reference numbers, unless expressly described otherwise. As discussed above, the drive system 110 may move the platform 106 forward so that the platform 106 extends out of the front open end of the receptacle 102 and backward to retract the platform 106 into the cavity 104 of the receptacle 102. As the drive system 110 extends the platform 106 out of the front open end of the receptacle 102, the handle 116 may be raised and/or lowered to cut slices of cheese, grate cheese, and so forth depending on the type of accessory 118 attached to the handle 116.

The distance that the platform 106 extends out of the front open end of the receptacle 102 is based on how many times the gears 112 of the drive system 110 are rotated. The more the gears are rotated, the farther the platform 106 may extend from the front open end of the receptacle 102. A user may rotate the gears 112 such that the slices may be a desired thickness or the amount of cheese grated may be a desired amount. The type of drive system 110 the multi-functional cheese storage container 100 includes is not intended to be limiting. The multi-functional cheese storage container 100 may include other types of drive systems 110 to move the platform 106 forward and/or backward. For example, a bottom of the platform 106 may be connected to a rotating bolt, where when the bolt rotates a clockwise direction the platform 106 is moved forward and when the bolt rotates a counterclockwise direction the platform 106 moves backward, or vice versa. In another example, the platform 106 may slide forward and backward along guide rails along the interior of the receptacle 102 and a user may pull or push the platform 106 to adjust how far the platform 106 extends from the open front end of the receptacle. In another example, the drive system 110 may push or pull the platform 106 from a back end of the receptacle 102.

Figure 3B:
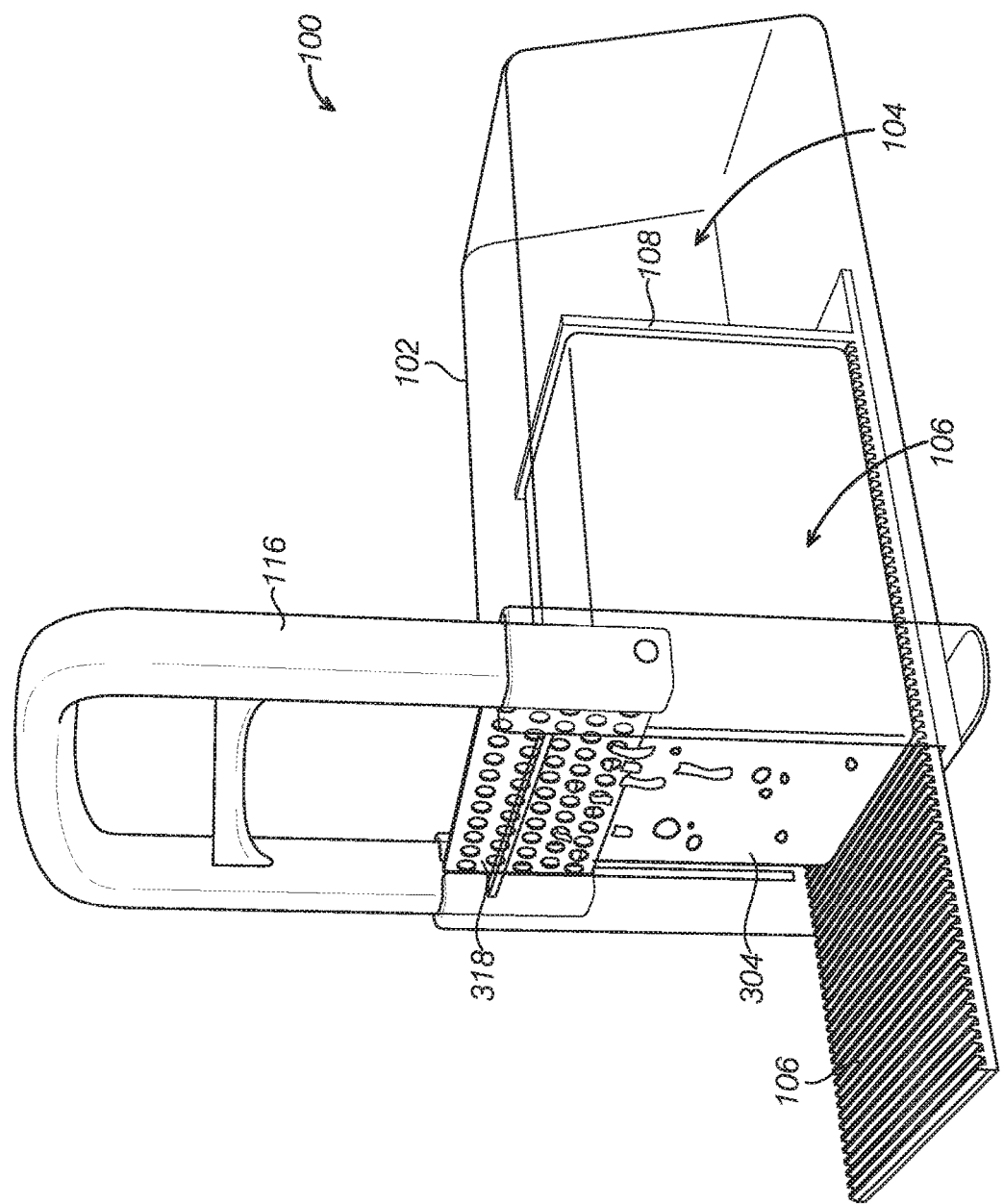
FIG. 3B illustrates a side perspective view of the multi-functional cheese storage container grating cheese from a brick of cheese, according to an embodiment.

FIG. 3B illustrates a side perspective view of the multi-functional cheese storage container 100 grating cheese from a brick of cheese 304, according to an embodiment. Some of the features in FIG. 3B are the same or similar to some of the features in FIGS. 1-3A as noted by same reference numbers, unless expressly described otherwise. As discussed above, the handle 116 of the multi-functional cheese storage container 100 may include an accessory 118. In one example, the accessory 118 may be a cheese grater 318 that may grate at least a portion of a brick of cheese 304. In one embodiment, the cheese grater 318 may be a flat planar panel with grating elements or perforations throughout. The perforations may be round or oval and have a raised side to facilitate grating of the cheese. The perforations may vary in size and number depending on the how the user desires to grate the cheese. For example, whether a user desires course or fine cheese may vary the size of the perforations. In another embodiment, the cheese grater 318 may be integrated into a part of the handle 116. An advantage of integrating the cheese grater 318 into the handle may be to reduce user discomfort and muscle fatigue when grating the cheese.

To grate the brick of cheese 304, the drive system 110 may push the platform 106 with the brick of cheese 304 forward towards the front open end of the receptacle 102. In one embodiment, when the brick of cheese 304 presses against the grater, the drive system 110 may stop, a portion of the brick of cheese 304 may be grated by moving the handle 116 up and down, and the steps may be repeated until a desired amount of the brick of cheese 304 has been grated. In another embodiment, as the drive system 110 may push the platform 106 with the brick of cheese 304 forward towards the front open end of the receptacle 102 as the handle 116 simultaneously is raised and lowered to grate the brick of cheese 304, until the desired amount of cheese has been grated. When the accessory 118 is a cheese slicer, the drive system 110 may extend the platform 106 forward and a user may lift and lower the handle 116 each time a piece of cheese is sliced.

Figure 4:
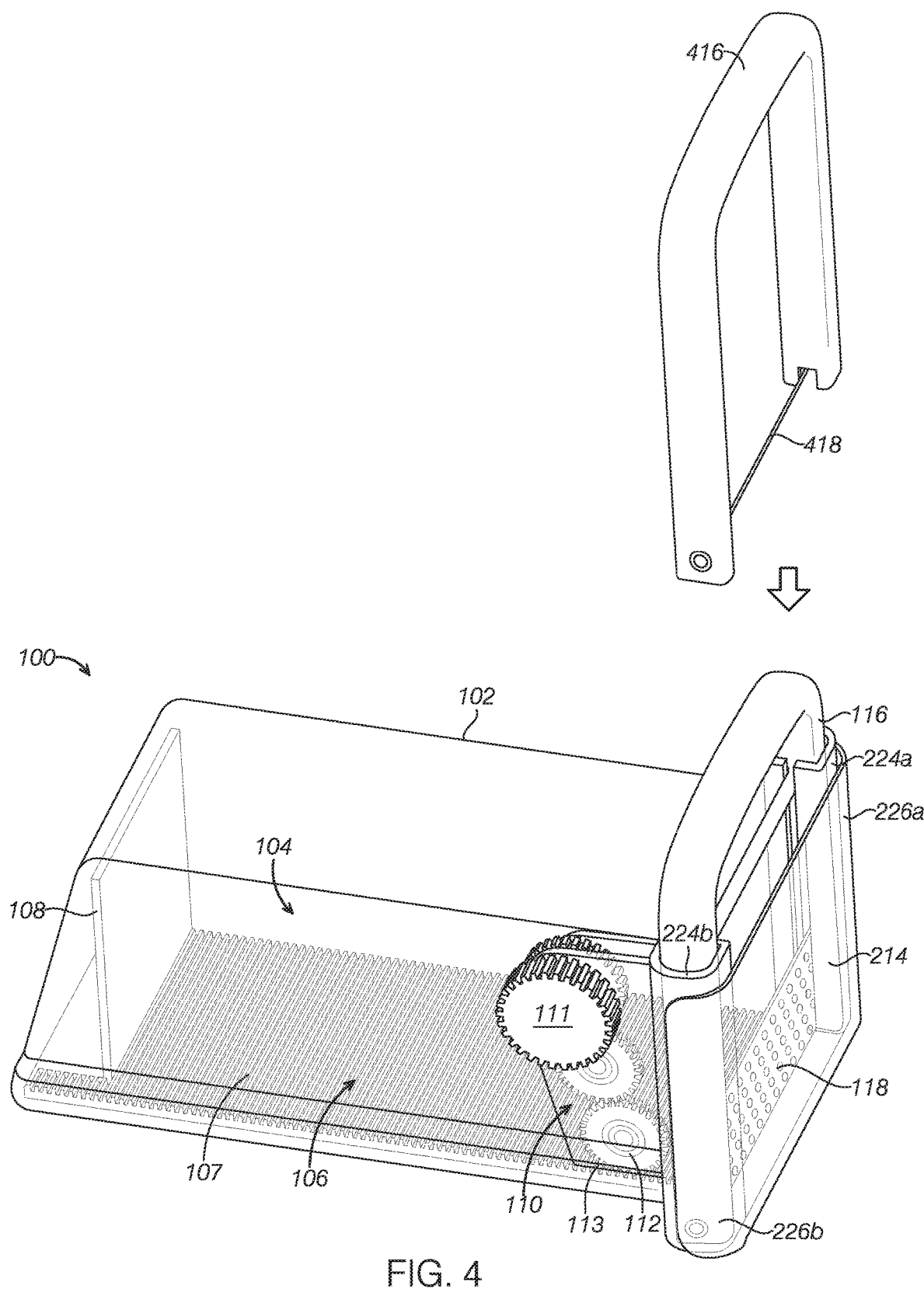
FIG. 4 illustrates the multi-functional cheese storage container with interchangeable handles, according to an embodiment.

FIG. 4 illustrates the multi-functional cheese storage container 100 with interchangeable handles, according to an embodiment. Some of the features in FIG. 4 are the same or similar to some of the features in FIGS. 1-3B as noted by same reference numbers, unless expressly described otherwise. As discussed above, the handle 116 may include an accessory 118 to chop, slice, or grate a brick of cheese. In one embodiment, the accessory 118 may be interchangeable with other accessories, where the accessory 118 may be removed from the handle 116 and another accessory may be inserted. To change the accessory 118 with another accessory, the accessory 118 may slide out of the handle 116, may be unbolted from the handle 116, may have force applied to it to remove it when it is held in by a friction fit, and so forth. The other accessory may then be slid into part of the handle 116, may be bolted to the handle 116, may have force applied to it to insert it when it is held in by a friction fit, and so forth.

In another embodiment, the accessory 118 may be integrated into the handle 116 where the accessory 118 is fixed and not interchangeable. In one example, at a first point in time a user may desire to use a first handle 116 that includes a wire slicer as the accessory 118 and at a second point in time the user may desire to use a second handle 416 that includes a cheese grater as the accessory 418. The first handle 116 may be held in the tracks or cavities 224a and 224b by one or more fasteners, such as clips, hooks, screws, and so forth. To interchange the first handle 116 with the second handle 416, a user may unfasten the fastener holding the first handle 116 in the tracks or cavities 224a and 224b, insert the second handle 416 into the tracks or cavities 224a and 224b, and insert the fastener into the second handle 416 to hold the second handle 416 in the tracks or cavities 224a and 224b. In another example, the first handle 116 may form a friction fit with the tracks or cavities 224a and 224b. To remove the first handle 116 a first threshold amount of force may be applied upwardly to the first handle 116 to remove the first handle from the tracks or cavities 224a and 224b and a second threshold amount of force may be applied downwardly to insert the second handle 416 into the tracks or cavities 224a and 224b.

The first handle 116 and/or the second handle 416 may include a spring to raise the first handle 116 and/or the second handle 416 upward into an initial position to use for cutting, slicing, or grating. As the first handle 116 and/or the second handle 416 is used, the spring may return the first handle 116 or the second handle 416 to the initial upward position to be ready for the next cutting, slicing, or grating. In one embodiment, the spring may be integrated into the first handle 116 and/or the second handle 416. In another embodiment, the spring may be integrated into the tracks or cavities 224a and 224b such that the spring is not interchanged with the first handle 116 and the second handle 416. In another embodiment, the first handle 116 and/or the second handle 416 and may be raised to the initial upward position manually by a user. The interchangeable first handle 116 and the second handle 416 may provide a user with a multi-functional cheese storage container 100.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. An apparatus, comprising:
a receptacle that include a first cavity to store a brick of cheese, wherein the receptacle includes an open end to receive the brick of cheese;
a platform located within the first cavity, the platform comprising:
a floor for the brick of cheese to sit on, wherein the floor comprises a set of grooves running laterally from a first side of the floor to a second side of the floor; and
a back wall perpendicularly connected to the floor, wherein the back wall is configured to abut against a back end of the brick of cheese;
a drive system connected to the platform, the drive system being configured to extend the platform out of the open end and retract the platform within the first cavity, wherein the drive system comprises:
a knob configured to rotate clockwise and counter-clockwise, the knob comprising a pinion gear with a first set of teeth, said pion gear concentrically affixed to a side face of said knob; and
a second gear comprising a second set of teeth that correspond to the first set of teeth, wherein:
said first set of teeth rotationally engage said second set of teeth; and
said second set of teeth also engage one or more grooves of the set of grooves of the floor;
a cover configured to attach to the open end of the receptacle to form an air-tight seal around the open end when the cover is in a closed position; and
a first handle configured to attach to the open end of the receptacle, the first handle comprising a first accessory configured to engage the brick of cheese.

2. The apparatus of claim 1, wherein the first accessory is a blade, a slicing wire, or a cheese grater.

3. The apparatus of claim 1, further comprising a second handle that includes a second accessory, wherein:
the second handle is interchangeable with the first handle; and
the second accessory is a different type of accessory than the first accessory.

4. The apparatus of claim 1, wherein the cover comprises at least one hinge to connect the cover to the open end of the receptacle, wherein the at least one hinge is configured to rotate the cover between an open position and the closed position.

5. The apparatus of claim 1, wherein the cover comprised at least one clasp configured to fasten the cover to the open end of the receptacle to form the air-tight seal when the cover is in the closed position.

6. The apparatus of claim 1, wherein the receptacle comprises a track approximate the open end of the receptacle, wherein the track comprises a second cavity is configured to receive a portion of the handle to connect the first handle to the receptacle.

7. The apparatus of claim 6, wherein the cover is configured to slide over at least a portion of the track to connect the cover to the open end of the receptacle to form the air-tight seal.

8. The apparatus of claim 6, wherein the cover is configured to snap around at least a portion of the track to connect the cover to the open end of the receptacle to form the air-tight seal.

9. The apparatus of claim 1, wherein the first handle is configured to interchangeably receive the first accessory and a second accessory.

10. The apparatus of claim 1, wherein the first handle comprise a spring, wherein the spring is configured to raise the first handle to a first position to slice or grate the brick of cheese with the first accessory.

11. The apparatus of claim 1, wherein the first handle comprise a fastener to connect the first handle to the open end of the receptacle.

12. The apparatus of claim 1, wherein the drive system is configured to extend the platform out of the open end of the receptacle to a defined distance such that the brick of cheese is configured to cut a slice of cheese from the brick of cheese with a uniform thickness to another slice of cheese.

13. The apparatus of claim 1, wherein:
a first portion of the knob is connected to an outer surface of the receptacle;
a second portion of the knob extends from the outer surface of the receptacle to an inner surface of the receptacle;
the gear is located within the cavity; and
the gear it configured to couple to the second portion of the knob.

14. A device, comprising:
a receptacle that include a cavity to store a piece of cheese, wherein the receptacle includes an open end;
a platform located within the cavity, the platform comprising a floor for the piece of cheese to sit on, wherein the floor includes a set of grooves;
a drive system connected to the platform, the drive system being configured to extend the platform out of the open end and retract the platform within the cavity, wherein the drive system comprises a gear comprising a set of teeth configured to engage one or more grooves of the set of grooves of the floor; and
a first handle configured to attach to the open end of the receptacle, the first handle comprising a first accessory to engage the piece of cheese.

15. The device of claim 14, further comprising a cover configured to attach to the open end of the receptacle to form an air-tight seal around the open end.

16. The device of claim 14, further comprising a second handle that includes a second accessory, wherein:
the second handle is interchangeable with the first handle; and
the second accessory is a different type of accessory than the first accessory.

17. The device of claim 15, the cover further comprising at least one track along a surface of the cover, the at least one track configured to guide the platform as the platform extends out of the open end of the receptacle.

* * * * *